United States Patent
Smith et al.

(10) Patent No.: US 7,597,353 B2
(45) Date of Patent: Oct. 6, 2009

(54) INFLATOR DEVICE HAVING AN ANNULAR INFLATION GAS DISCHARGE OPENING

(75) Inventors: Bradley W. Smith, Plain City, UT (US); Matthew A. Cox, Centerville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 403 days.

(21) Appl. No.: 11/440,976

(22) Filed: May 25, 2006

(65) Prior Publication Data

US 2007/0273132 A1    Nov. 29, 2007

(51) Int. Cl.
B60R 21/26 (2006.01)
(52) U.S. Cl. .................. 280/736; 280/741
(58) Field of Classification Search .......... 280/741, 280/736
See application file for complete search history.

(56) References Cited

U.S. PATENT DOCUMENTS

| | | | | |
|---|---|---|---|---|
| 4,278,638 A | * | 7/1981 | Nilsson et al. ............ 422/166 |
| 4,547,342 A | * | 10/1985 | Adams et al. ............ 422/166 |
| 4,902,036 A | * | 2/1990 | Zander et al. ............ 280/736 |
| 5,003,887 A | * | 4/1991 | Unterforsthuber et al. .. 102/531 |
| 5,062,367 A | | 11/1991 | Hayashi et al. |
| 5,064,459 A | * | 11/1991 | Unterforsthuber et al. .... 55/512 |
| 5,114,179 A | * | 5/1992 | Emery et al. ............ 280/741 |
| 5,139,280 A | * | 8/1992 | Cord et al. ............ 280/741 |
| 5,149,129 A | * | 9/1992 | Unterforsthuber et al. .. 280/740 |
| 5,306,041 A | | 4/1994 | Ogawa et al. |
| 5,374,407 A | * | 12/1994 | Decker et al. ............ 422/305 |
| 5,505,488 A | | 4/1996 | Allard |
| 5,738,374 A | * | 4/1998 | Marsaud et al. ............ 280/741 |
| 5,813,695 A | * | 9/1998 | O'Driscoll et al. ............ 280/741 |
| 6,079,739 A | * | 6/2000 | Perotto et al. ............ 280/736 |
| 6,095,558 A | | 8/2000 | Bayer et al. |
| 6,123,359 A | * | 9/2000 | Cabrera et al. ............ 280/741 |
| 6,183,008 B1 | | 2/2001 | Prokopec et al. |
| 6,336,660 B1 | | 1/2002 | Katsuda et al. |
| 2003/0184068 A1 | * | 10/2003 | Nakashima et al. ......... 280/741 |
| 2005/0121894 A1 | | 6/2005 | Brisighella, Jr. et al. |
| 2006/0082113 A1 | | 4/2006 | Smith et al. |
| 2006/0119086 A1 | * | 6/2006 | Blessing et al. ............ 280/736 |
| 2006/0186653 A1 | * | 8/2006 | Schoenhuber ............ 280/741 |
| 2007/0273131 A1 | * | 11/2007 | Smith et al. ............ 280/736 |

* cited by examiner

*Primary Examiner*—Ruth Ilan
(74) *Attorney, Agent, or Firm*—Sally J Brown; Pauley Petersen & Erickson

(57) ABSTRACT

An inflator device for inflating an inflatable cushion of an inflatable cushion restraint system. The inflator device includes a reaction housing defining a reaction chamber containing a supply of gas generant material. An initiator device is connected to the reaction housing and is in reaction initiating communication with the supply of gas generant material. A filter housing is disposed around at least a portion of the reaction housing and at least in part defines a filter chamber. The filter housing includes an annular discharge opening. The produced inflation gas discharges from the filter housing to the inflatable cushion through the annular discharge opening. A filter is disposed in the filter chamber and external of the reaction housing.

17 Claims, 4 Drawing Sheets

INFLATOR DEVICE HAVING AN ANNULAR INFLATION GAS DISCHARGE OPENING

BACKGROUND OF THE INVENTION

This invention relates generally to the providing or supplying of inflation gas and, more particularly, to the providing or supplying of such inflation gas via a toroidal-shaped inflator such as may be desired for certain inflatable passive restraint systems for use in vehicles for restraining the movement of an occupant in the event of a vehicular collision.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator devices used in inflatable passive restraint systems is commonly referred to as a pyrotechnic inflator. In such inflator devices, gas used in the inflation of an associated inflatable element is derived from the combustion of a pyrotechnic gas generating material.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply (e.g., mass flow rate) of inflation gas, for example, can be selectively and appropriately varied dependent on selected operating conditions such as ambient temperature, occupant presence, seat belt usage and rate of deceleration of the motor vehicle, for example.

While such adaptive systems are desirable, they typically require the inclusion of additional components as a part of the associated inflator device and such as may undesirably increase one or more of the size, cost and weight of the inflator device. For example, various proposed or available dual stage inflator devices appear based on the principle of packaging together two separate gas generating inflators that can be actuated simultaneously or at a desired time interval.

There is an on-going need for more efficient and cost-effective inflator devices having improved inflation gas flow characteristics. There is also an on-going need for a more efficient and cost-effective adaptive inflator.

SUMMARY OF THE INVENTION

A general object of the invention is to provide an improved inflator device for use in an inflatable safety restraint systems.

A more specific objective of the invention is to overcome one or more of the problems described above.

The general object of the invention can be attained, at least in part, through an inflator device for inflating an inflatable cushion of an inflatable cushion restraint system. The inflator device includes a supply of gas generant material to produce inflation gas upon reaction initiation. The inflator device includes a reaction housing having a reaction housing side wall and at least in part defining a reaction chamber containing the supply of gas generant material. An initiator device is connected to the reaction housing and is in reaction initiating communication with the supply of gas generant material. The reaction housing side wall includes a plurality of reaction housing discharge openings. Upon reaction initiation of the supply of gas generant material, the inflation gas discharges from the reaction chamber through the reaction housing discharge openings. A filter housing is disposed around at least a portion of the reaction housing and at least in part defines a filter chamber. The filter housing includes an annular discharge opening. The inflation gas discharges from the filter housing to the inflatable cushion through the annular discharge opening. A filter is disposed in the filter chamber and external of the reaction housing.

Compared to the inflator device of the invention, the prior art generally fails to describe or provide inflator devices having a modular construction and which provide as efficient as desired assembly while also providing desirably improved inflation gas flow characteristics.

The invention further comprehends an inflator device for an inflatable cushion restraint system. The inflator device includes a cylindrical reaction housing defining a reaction chamber containing a supply of gas generant material. The reaction housing has a side wall including a plurality of reaction housing discharge openings. Upon reaction initiation of the supply of gas generant material, inflation gas is produced and discharges from the reaction chamber through the reaction housing discharge openings. An initiator device is in reaction initiating communication with the supply of gas generant material.

The inflator device includes a filter housing having a base portion and a top portion and at least in part defining a filter chamber. The filter housing base portion is disposed around and secured to the reaction housing side wall and the filter housing top portion is attached to an end of the reaction housing side wall. A filter housing discharge opening is formed between the filter housing base portion and top portion. A filter is disposed in the filter chamber and external of the reaction housing.

The invention still further comprehends a toroidal-shaped inflator device for an inflatable cushion restraint system. The inflator device includes a cylindrical reaction housing having a side wall and an end wall at a first end of the side wall. The reaction housing side wall includes a circumferential ridge extending outward from an outer surface of the side wall, and a plurality of reaction housing discharge openings. The reaction housing at least in part defines a reaction chamber containing a supply of gas generant material. Upon reaction initiation of the supply of gas generant material, inflation gas is produced and discharges from the reaction chamber through the reaction housing discharge openings. An initiator device is connected to the reaction housing end wall and in reaction initiating communication with the supply of gas generant material.

The inflator device includes a filter housing having a base portion and a top portion, and at least in part defining a filter chamber. The filter housing base portion is disposed around the reaction housing side wall and abuts the ridge. The filter housing top portion is attached by a weld to a second end of the reaction housing side wall that is opposite the first end. An annular discharge opening is formed between the filter housing base portion and top portion and a filter is disposed in the filter chamber and external of the reaction housing. The filter is disposed between the filter housing top portion and bottom portion and the filter holds the filter housing base portion against the reaction housing ridge.

The inflator device of this invention is available for use in various inflatable cushion restraint system, such as a driver side or a passenger side inflatable cushion restraint system.

As used herein, references to "discharge orientation" are to be understood to refer to a positioning of an opening toward an element such that a reaction product or inflation gas discharging through the opening is generally discharged in a direction toward the element.

Other objects and advantages will be apparent to those skilled in the art from the following detailed description taken in conjunction with the appended claims and drawings.

DETAILED DESCRIPTION OF THE INVENTION

The present invention provides an inflator device, such as a driver side inflator device for placement within a vehicle steering wheel. The inflator device of the invention incorporates a filter that is disposed outside, or "external," of the reaction chamber(s). Such an external filter of the inflator device of the invention provides for less free volume and reduced thermal mass inside the reaction chamber, and allows ignition with a reactable booster material in a lesser relative amount than is generally common in current commercial inflator devices. This booster material can be included as a relatively small secondary charge. Alternatively, as discussed below, a relatively larger initiator device can be employed. Also, higher reaction pressures upon actuation can generally be confined to the reaction chamber(s), so that the filter housing endures generally lower pressures, thereby allowing for an inflator device of generally lesser weight as only the reaction housing(s) may be required to be designed to withstand the higher internal pressures.

The inflator device of one embodiment of the invention also desirably provides a thrust neutral discharge both within, e.g., from one chamber to the next, and from the inflator device. The internal reaction chambers and the inflator device include one or more radial discharge openings disposed in a thrust neutral array. The inflator device of one embodiment of the invention provides a diffused lower velocity gas flow by directing the reaction product and/or inflation gas flow through one or more change of directions before exiting the inflator device. In one embodiment of this invention, the inflator device includes an annular inflation gas discharge opening that desirably provides a larger flow area that can desirably decrease stresses during inflation of an associated inflatable cushion. Additional benefits of the inflator device of the invention include reduced noise production during deployment, improved effluents, and less particulate, such as pieces of ruptured foil seals, entering the inflatable cushion.

In one embodiment of this invention, the inflator device has a modular construction. For example, an inflation gas producing reaction housing is preassembled and combined with a filter housing during final assembly. Modular construction according to one embodiment of the invention allows for greater efficiency manufacture of reaction housings and inflator devices. In addition, the same modular reaction chamber can be alternatively incorporated into more than one type of inflator device, thereby allowing for the assembly of more than one type of inflator device, e.g., first stage passenger, second stage passenger and single stage driver, on the same production line with similar or the same tooling. Customer specific operations can be moved to the final assembly stage from the reaction housing production stage(s), thereby reducing production line changeovers.

Figure 1:
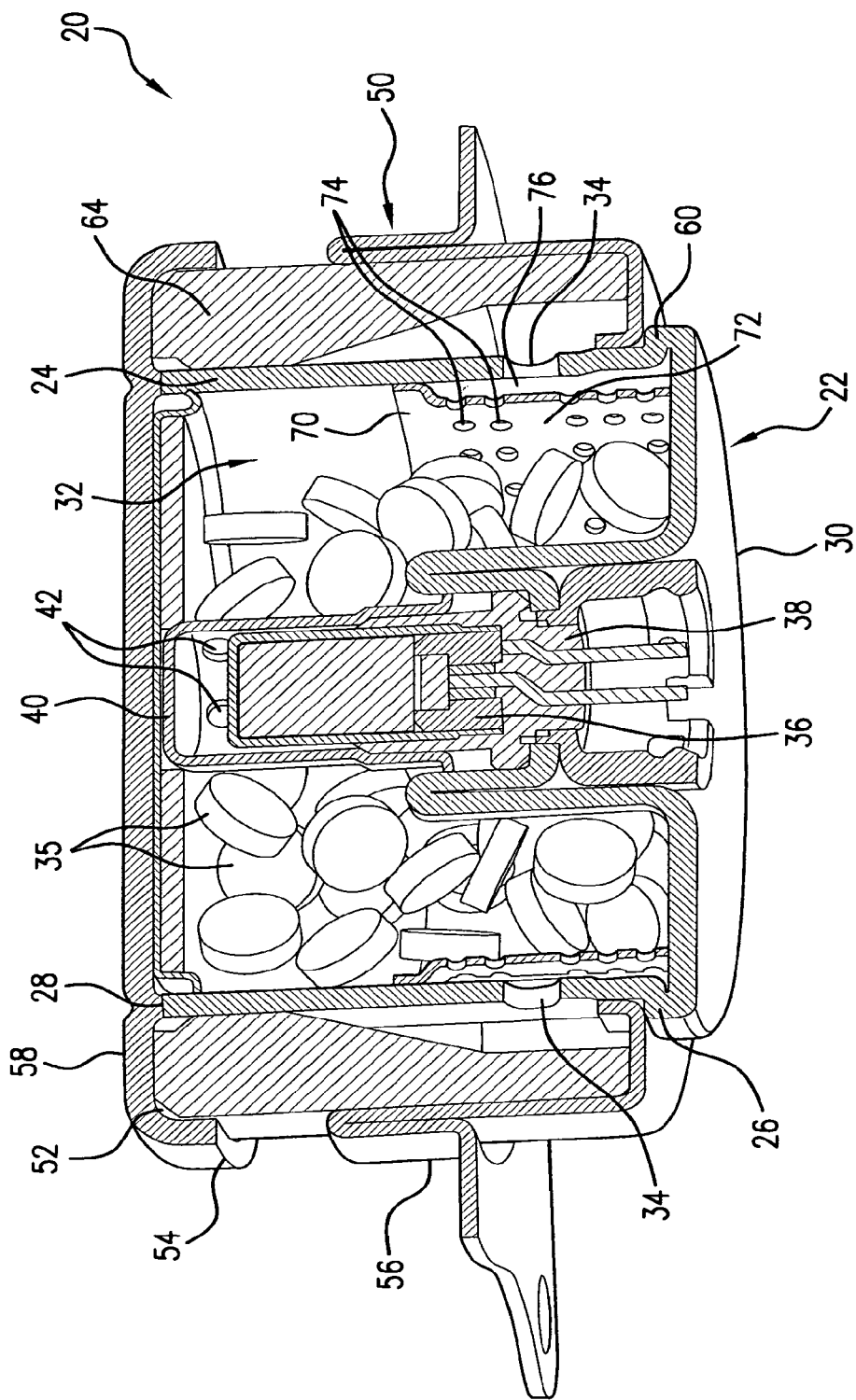
FIGS. 1 and 2 illustrate a toroidal-shaped inflator device for inflating an inflatable cushion of an inflatable cushion restraint system according to one embodiment of this invention.
Figure 2:
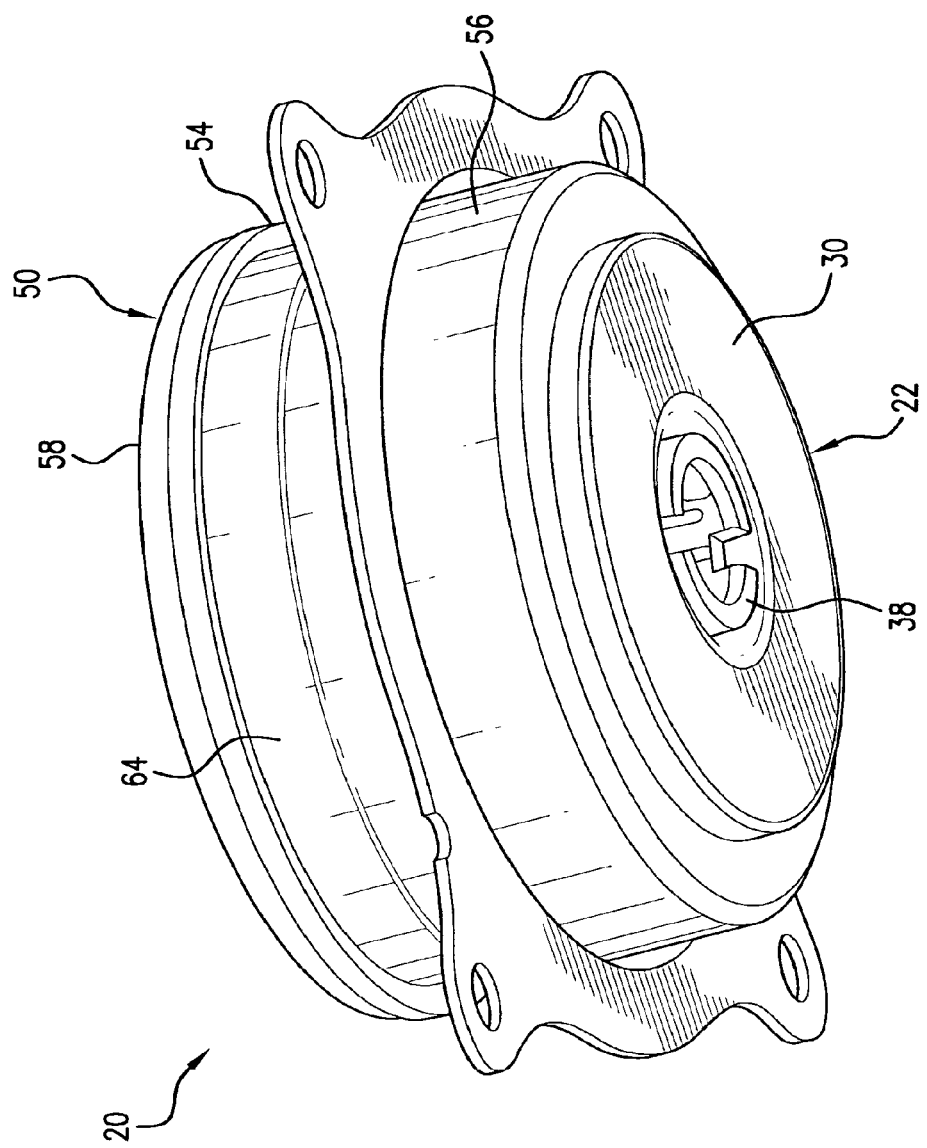

FIGS. 1 and 2 illustrate a toroidal-shaped inflator device 20 for inflating an inflatable cushion of an inflatable cushion restraint system according to one embodiment of this invention. The inflator device 20 has a form of a flattened, disk-shaped circular cylinder.

The inflator device 20 includes a reaction housing 22. The reaction housing 22 has a reaction housing side wall 24 having a first end 26 and a second end 28 opposite the first end 26. The reaction housing 22 has an end wall 30 at the side wall first end 26. The reaction housing 22 in part defines a reaction chamber 32 containing a supply of gas generant material 35. The supply of gas generant material 35 can generally be any type and form known and available to those skilled in the art, such as tablets shown in FIG. 1, wafers, granules, and combinations thereof, for example.

The reaction housing side wall 24 includes a plurality of reaction housing discharge openings 34. Upon reaction initiation of the supply of gas generant material 35 to produce inflation gas, the inflation gas discharges from the reaction chamber 32 through the reaction housing discharge openings 34. Those skilled in the art and guided by the teachings herein provided will appreciate that various sizes, shapes and configurations are available for the reaction housings and the radially oriented chamber discharge openings of the invention, and can be suitably configured as may be desired for a particular application.

An initiator device 36, such as is known and available to those skilled in the art, is connected to the reaction housing end wall 30. The initiator device 36 is in reaction initiating communication with the supply of gas generant material 35, such that upon the initiator device 36 receiving an actuating electrical signal, the initiator device 36 produces a reaction product that actuates the gas generant material 35 to produce inflation gas for inflating an associated inflatable cushion (not shown). The initiator device 36 is desirably connected to the end wall 30 by an injected molded material in the form of an adapter 38.

An initiator diffuser 40 is disposed between the initiator device 36 and the supply of gas generant material 35. The initiator diffuser 40 includes a plurality of radially oriented diffuser discharge openings 42 disposed in discharge orientation toward the reaction housing side wall 24. As will be appreciated by those skilled in the art following the teachings herein provided, various sizes, shapes and configurations are available for the initiator diffuser and the radially oriented diffuser discharge openings of the invention. The initiator diffuser 40 in the illustrated embodiment is desirably press fit into place. The radial oriented diffuser discharge openings 42 provide a thrust neutral reaction product discharge. The initiator diffuser 40 desirably shields the gas generant 35 from the reaction of the initiator device 36, thereby reducing or eliminating any breakage of the gas generant material tablets 35 and providing a more repeatable ignition. Generally, gas generant tablet or wafer breakage can affect the inflation gas production performance, due to increased surface area of the gas generant material.

A filter housing 50 is disposed around at least a portion of the reaction housing 22. The filter housing in part defines a filter chamber 52. The filter housing 50 includes a filter housing discharge opening 54 through which inflation gas produced by the gas generant material 35 discharges from the filter housing 50 to an inflatable cushion (not shown). In the embodiment shown in FIGS. 1 and 2, the filter housing discharge opening 54 is an annular discharge opening. The annular inflation gas discharge opening of the inflator device of the invention desirably provides a larger and continuous inflation gas discharge flow area that can desirably decrease inflation stresses on an inflating inflatable cushion. The internal reaction chambers and the inflator device include one or more radial discharge openings disposed in a thrust neutral array. Also, due to directional changes of inflation gas flow within the inflator device of the invention, the inflator device provides a more diffused, and thus a lower velocity, inflation gas flow and discharge.

The filter housing 50 includes a base portion 56 and a top portion 58. The filter housing base portion 56 is disposed around and secured to the reaction housing side wall 24. In the embodiment shown in FIGS. 1 and 2, the reaction housing side wall 24 includes an outwardly extending ridge 60. The base portion 56 abuts the ridge 60. The filter housing top portion 58 is attached by a weld, e.g., a friction weld, to and over the second end 28 of the reaction housing 22. The filter housing discharge opening 54 is formed between the filter housing base portion 56 and top portion 58.

A filter 64 is disposed in the filter chamber 52 and external of the reaction housing 22. The filter 64 is disposed between the base portion 56 and the top portion 58 and has a tubular form extending around the reaction housing 22. The filter 64 can be formed of various and alternative materials known and available to those skilled in the art. In one preferred embodiment of the invention, the filter 64 is formed of a compressed or wrapped metal wire mesh. In one embodiment of the invention, the filer 64 desirably holds the filter housing base portion 56 against the reaction housing ridge 60. The filter 64 is held in place against the base portion 56 by the top portion 58, which in turn is welded to the reaction housing 22 to maintain the filter 64 and base portion 56 in place.

As discussed above, the inflator device of the invention is an inflator device having a form of a flattened, disk-shaped circular cylinder. Such an inflator device can be appropriately shaped and sized for driver side placement within a vehicle steering wheel. In one embodiment of the invention, the inflator device has a length (e.g., generally measured from the outer side of the reaction housing end wall 30 to the outer side of the opposing filter housing top portion 58) to diameter ratio between about 1.5:1 to 2:1. In one particularly preferred embodiment the inflator device has a length of about 34-40 mm, and a diameter (e.g., the outer diameter of the filter housing 50 (not including any outwardly extending attachment flanges or brackets)) of about 60-70 mm. In one embodiment of the invention, most components of the inflator device are formed of stamped steel, thereby reducing or eliminating the need for machined parts and providing robust and easily repeatable components.

In the embodiment of the invention shown in FIGS. 1-2, the reaction housing 22 includes a strainer element 70 therein. The strainer element 70 is disposed between the supply of gas generant material 35 and the plurality of radially oriented chamber discharge openings 34. The strainer element 70 includes a strainer side wall 72 aligned with the reaction housing side wall 24. The strainer side wall 72 includes a plurality of strainer discharge openings 74. In one embodiment of the invention, as shown in FIG. 1, none of the plurality of strainer discharge openings 74 are directly aligned with, or in direct discharge orientation with, any of the chamber discharge openings 34. As seen in FIG. 1, the strainer discharge openings 74 are in discharge orientation with the reaction housing wall 24, thereby not providing a direct or straight inflation gas discharge route to the filter chamber 52. The strainer element 70 of the invention aids in providing a diffused inflation gas flow, and also assists in reducing or eliminating any particulate discharge from the reaction housing 22. The strainer 70 is desirably press fit into the reaction chamber.

A rupturable sealing member 76, such as is known to those skilled in the art, is disposed between the strainer element 70 and the reaction housing side wall 24. The sealing member 76 desirably seals the gas generant material 35 from the ambient environment before actuation. In one embodiment of the invention, the sealing member 76 includes a metal foil. As will be appreciated by those skilled in the art following the teachings herein provided, various and alternative sizes, shapes and configurations are available for the strainer element, strainer discharge openings, and sealing member of the invention.

Figure 3:
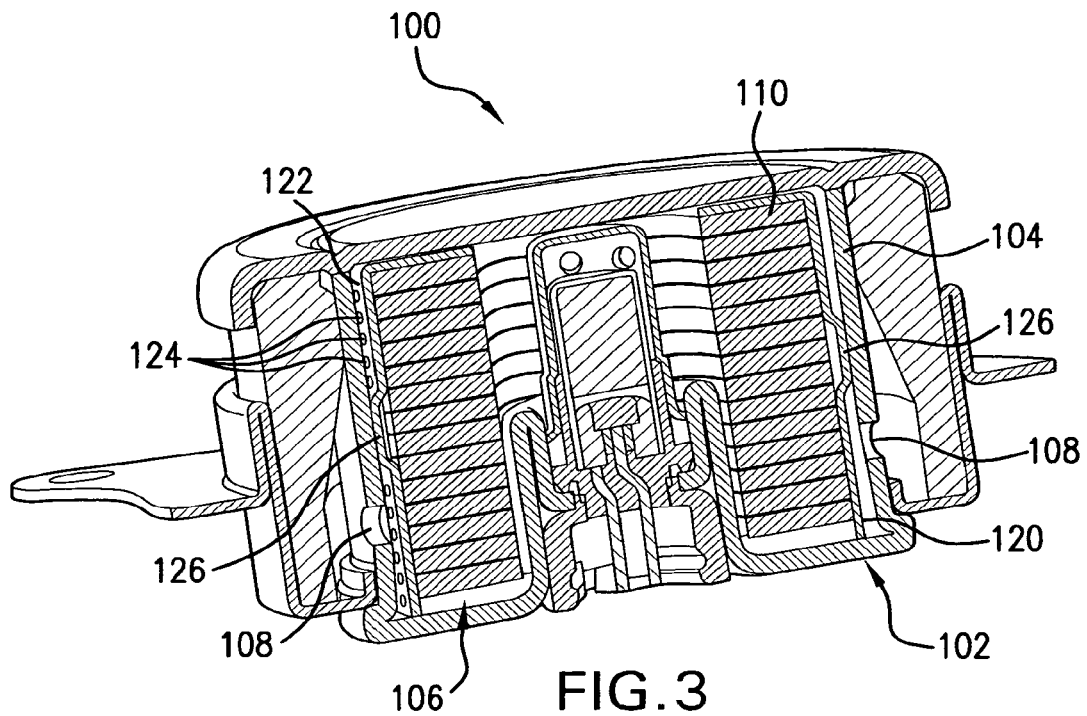
FIG. 3 illustrates a toroidal-shaped inflator device for inflating an inflatable cushion of an inflatable cushion restraint system according to another embodiment of this invention.

FIG. 3 illustrates a toroidal-shaped inflator device 100 for inflating an inflatable cushion of an inflatable cushion restraint system according to another embodiment of this invention. The inflator device is similar to the inflator device 20 discussed above, differing in the gas generant material and the strainer element. The inflator device 100 includes a reaction housing 102 having a side wall 104 in part defining a reaction chamber 106. The side wall 104 includes a plurality of radially oriented chamber discharge openings 108. The gas generant material 110 within the reaction chamber 106 is composed of a wafer form of gas generant material.

A strainer element 120 is disposed between the supply of gas generant material 110 and the reaction housing side wall 104. The strainer element 120 includes a strainer side wall 122 aligned with the reaction housing side wall 104. The strainer element side wall 122 includes a plurality of strainer discharge openings 124. The strainer element 120 of the embodiment of FIG. 3 is larger than that shown in FIG. 1, and extends the length of the reaction chamber 106. The strainer side wall 122 includes a plurality of outwardly extending spacer portions 126 that maintain spacing between the strainer side wall 122 and the reaction housing side wall 104 to allow inflation gas discharging from the strainer element 120 to flow to the radially oriented chamber discharge openings 108.

Figure 4:
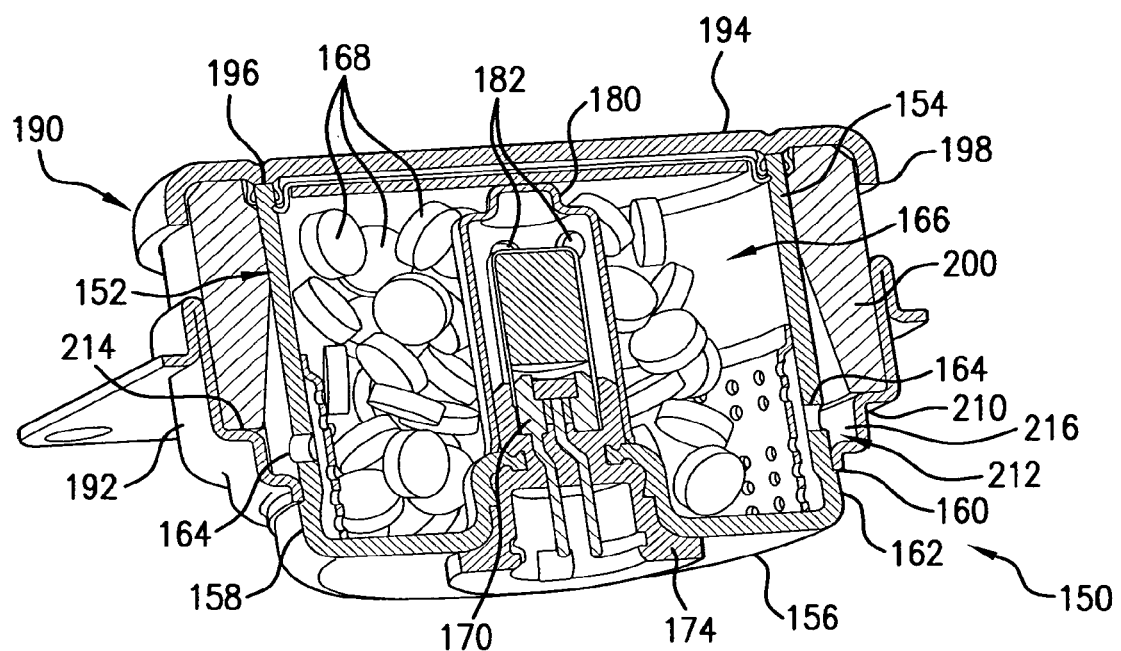
FIG. 4 illustrates a toroidal-shaped inflator device for inflating an inflatable cushion of an side inflatable cushion restraint system according to yet another embodiment of this invention.

FIG. 4 is a toroidal-shaped inflator device 150 for an inflatable cushion restraint system according to another embodiment of the invention. The inflator device 150 includes a cylindrical reaction housing 152 having a cylindrical side wall 154 and an end wall 156 at a first end 158 of the side wall 154. The reaction housing side wall 154 includes a circumferential ridge 160 extending outward from around an outer surface 162 of the side wall 154 and a plurality of reaction housing discharge openings 164. The reaction housing 152 in part defines a reaction chamber 166 containing a supply of gas generant material 168.

An initiator device 170 is connected to the reaction housing end wall 156, and is in reaction initiating communication with the supply of gas generant material 168. The initiator device 170 is connected to the end wall 156 by an injected molded material 174. An initiator diffuser 180 is press fitted over the injected molded material 174 and disposed between the initiator device 170 and the supply of gas generant material 168. The initiator diffuser 180 includes a plurality of radially oriented diffuser discharge openings 182 disposed in discharge orientation toward the reaction housing side wall 154.

A filter housing 190 includes a base portion 192 disposed around and secured to the reaction housing side wall 154. The base portion 192 abuts the ridge 160. The filter housing 190 also includes a top portion 194 attached by a weld to and over a second end 196 of the reaction housing 152. An annular discharge opening 198 is formed between the filter housing base portion 192 and top portion 194.

A filter 200 is disposed external of the reaction housing 152 and between the filter housing top portion 192 and bottom portion 194. The filter housing base portion 192 is generally held against the ridge 160 by the filter 200 and the filter 200 is generally held against the filter housing base portion 192 by the filter housing top portion 194. In the embodiment of FIG. 4, the filter 200 is not disposed over any of the plurality of reaction housing discharge openings 164. The filter housing base portion 192 includes a shoulder 210 extending into a filter chamber 212. The shoulder 210 includes a first shoulder face 214 and a second shoulder face 216 extending at an angle from the first shoulder-face 214. The filter 200 abuts the first shoulder face 214. The plurality of reaction housing discharge openings 164 are in discharge orientation toward the second shoulder face 216. Offsetting the filter 200 in this manner, such that the filter 200 is not disposed over the plurality of reaction housing discharge openings 164, can desirably reduce or eliminate degradation of the filter in particular embodiments of the invention.

Figure 5:
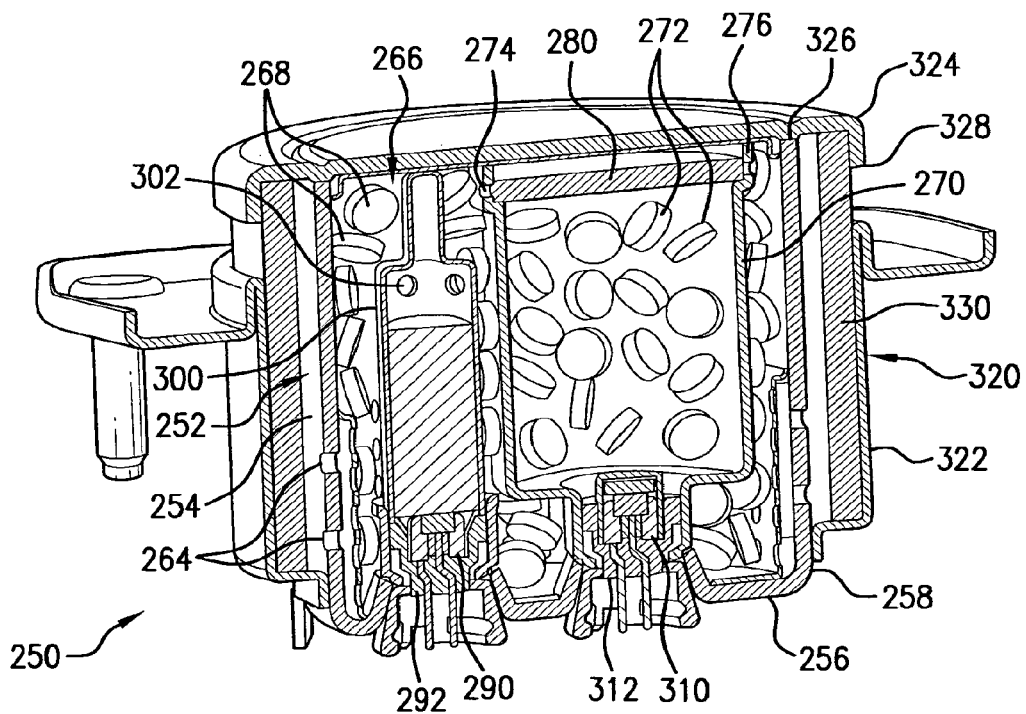
FIGS. 5 and 6 illustrate an adaptive inflator device for inflating an inflatable cushion of an inflatable cushion restraint system according to still yet another embodiment of this invention.
Figure 6:
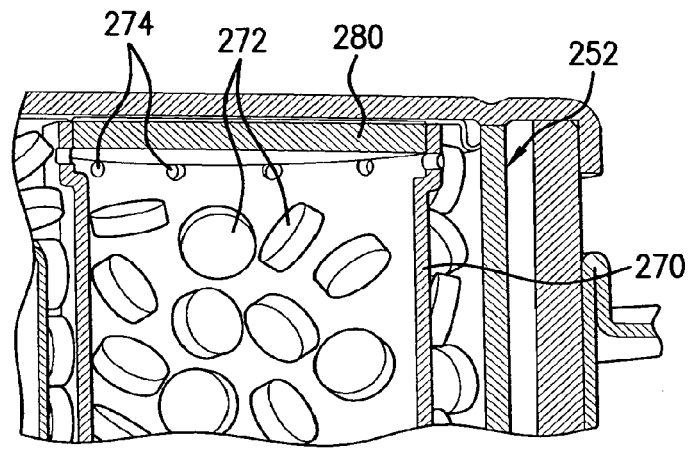

FIGS. 5 and 6 illustrate an adaptive inflator device 250 for inflating an inflatable cushion of an inflatable cushion restraint system, such as a passenger side inflatable cushion restraint system, according to yet another embodiment of this invention. The inflator device 250 includes a cylindrical first reaction housing 252 having a cylindrical side wall 254 and an end wall 256 at a first end 258 of the side wall 254. The reaction housing side wall 254 includes a plurality of first reaction housing discharge openings 264. The reaction housing 252 in part defines a first reaction chamber 266 containing a first supply of gas generant material 268.

A further second reaction housing 270 is disposed within the first reaction chamber 266 and contains a second supply of gas generant material 272. The second reaction housing 270 includes a plurality of second reaction housing discharge openings 274 at a first end 276. A lid 280 is disposed adjacent the plurality of second reaction housing discharge openings 274.

A first initiator device 290 is connected to the reaction housing end wall 256 and is in reaction initiating communication with the first supply of gas generant material 268. The initiator device 290 is connected to the end wall 256 by an injected molded adapter 292. An initiator diffuser 300 is disposed between the initiator device 290 and the supply of gas generant material 268. The initiator diffuser 300 includes a plurality of radially oriented diffuser discharge openings 302 disposed in discharge orientation toward the reaction housing side wall 254. The initiator diffuser 300 is desirably press fit into place.

A second initiator device 310 is also connected to the reaction housing end wall 256 and is in reaction initiating communication with the second supply of gas generant material 272. The initiator device 310 is connected to the end wall 256 by a second injected molded adapter 312.

A filter housing 320 includes a base portion 322 disposed around and secured to the reaction housing side wall 254. As an alternative to the circumferential ridge discussed above, the base portion 322 can be crimped or welded to the side wall 254. A filter housing 320 also includes a top portion 324 attached by a weld to and over a second end 326 of the reaction housing 252. An annular discharge opening 328 is formed between the filter housing base portion 322 and top portion 324. A filter 330 is disposed external of the reaction housing 252 and between the filter housing top portion 322 and bottom portion 324.

The inflator device 250 is an adaptive inflator device. In the inflator device 250, either one or both of the first and second initiator devices 290 and 310 can be actuated. Further, the first and second initiator devices 290 and 310 can be actuated simultaneously or in sequence. Thus, output parameters such as one or more of the quantity, supply, and rate of supply (e.g., mass flow rate) of inflation gas, for example, can be selectively and appropriately varied dependent on selected operating conditions such as ambient temperature, occupant presence, seat belt usage and rate of deceleration of the motor vehicle, for example.

FIG. 6 is a partial sectional view illustrating the second reaction housing 270 upon the actuation of the second initiator device 310 and the second supply of gas generant material 272. Inflation gas produced by the reacting gas generant material 272 increases the pressure within the second reaction housing 270. The increasing inflation gas pressure causes the lid 280 to raise and expose the plurality of second reaction housing discharge openings 274. Before actuation, the lid 280 blocks any inflation gas or other reaction product from the reactions within the first reaction housing 252 from entering the second reaction housing 270. Upon actuation of the second initiator device 310 and the production of inflation gas, the lid 280 moves to expose the second reaction housing discharge openings 274, thereby allowing the produced inflation gas to exit the second reaction housing 270, enter the first reaction housing 252, and ultimately discharge from the inflator device 250.

Thus, the invention provides a modular inflator device for improving manufacturing efficiency and reducing manufacturing costs. The inflator device of the invention provides a diffused and lower velocity gas flow, by directing the reaction product and/or inflation gas flow through one or more change of directions before exiting the inflator device. By moving the filter outside the reaction chambers, the inflator device can facilitate incorporation of direct ignition of the gas generant material using larger initiators in combination with an initiator diffuser. Also, the inflator device of the invention can include an annular inflation gas discharge opening that desirably results in a larger flow area that can desirably decrease stresses during inflation of an associated inflatable cushion.

As will be appreciated by those skilled in the art following the teachings herein provided, various and alternative sizes, shapes and configurations are available for the various components of the invention. The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an inflator device for inflating an inflatable cushion of an inflatable cushion restraint system, the inflator device including a supply of gas generant material to produce inflation gas upon reaction initiation, the improvement comprising:
    a reaction housing including a reaction housing side wall, the reaction housing at least in part defining a reaction chamber containing the supply of gas generant material;
    an initiator device connected to the reaction housing, the initiator device in reaction initiating communication with the supply of gas generant material;
    the reaction housing side wall including a plurality of reaction housing discharge openings, wherein upon reaction initiation of the supply of gas generant material, the inflation gas discharges from the reaction chamber through the reaction housing discharge openings;
    a strainer element disposed within the reaction housing and between the supply of gas generant material and the plurality of reaction housing discharge openings, the strainer element comprising a strainer side wall aligned with the reaction housing side wall and including a plurality of strainer discharge openings;
    a filter housing disposed around at least a portion of the reaction housing, the filter housing at least in part defining a filter chamber, the filter housing including an annular discharge opening, wherein the inflation gas discharges from the filter housing to the inflatable cushion through the annular discharge opening; and
    a filter disposed in the filter chamber and external of the reaction housing.

2. The inflator device according to claim 1 wherein the filter housing comprises a base portion and a top portion, wherein the filter is disposed between the base portion and the top portion.

3. The inflator device according to claim 1 having a form of a flattened, disk-shaped circular cylinder shaped and sized for driver side placement within a vehicle steering wheel.

4. The inflator device according to claim 1 additionally comprising an initiator diffuser disposed between the initiator device and the supply of gas generant material, the initiator diffuser including a plurality of radially oriented diffuser discharge openings disposed in discharge orientation toward the reaction housing side wall.

5. The inflator device according to claim 1 additionally comprising an injection-molded material surrounding at least a portion of the initiator device, wherein the initiator device is connected to the reaction housing by the injection-molded material.

6. The inflator device according to claim 1 wherein the reaction housing side wall comprises a ridge on an outer side, and a portion of the filter housing is disposed around the reaction housing side wall and abutting the ridge.

7. The inflator device according to claim 1 wherein none of the strainer discharge openings are directly aligned with any of the reaction housing discharge openings.

8. The inflator device according to claim 1 additionally comprising a sealing member disposed between the strainer element and the reaction housing side wall.

9. An inflator device for an inflatable cushion restraint system, the inflator device comprising:
    a cylindrical reaction housing defining a reaction chamber containing a supply of gas generant material, the reaction housing having a side wall including a plurality of reaction housing discharge openings, wherein upon reaction initiation of the supply of gas generant material, inflation gas is produced and discharges from the reaction chamber through the reaction housing discharge openings;
    a strainer element disposed within the reaction housing and between the supply of gas generant material and the plurality of reaction housing discharge openings, the strainer element comprising a strainer side wall aligned with the reaction housing side wall and including a plurality of strainer discharge openings, wherein none of the strainer discharge openings are directly aligned with any of the reaction housing discharge openings;
    an initiator device in reaction initiating communication with the supply of gas generant material;
    a filter housing comprising a base portion and a top portion and at least in part defining a filter chamber, the filter housing base portion disposed around and secured to the reaction housing side wall, the filter housing top portion attached to an end of the reaction housing side wall;
    a filter housing discharge opening formed between the filter housing base portion and top portion; and
    a filter disposed in the filter chamber and external of the reaction housing.

10. The inflator device according to claim 9 wherein the reaction housing includes a ridge extending around an outer surface of the side wall, and the filter housing base portion is disposed around the reaction housing side wall and abutting the ridge.

11. The inflator device according to claim 10 wherein the filter housing base portion is held against the ridge by the filter and the filter is held against the filter housing base portion by the filter housing top portion.

12. The inflator device according to claim 9 wherein the filter housing discharge opening comprises an annular discharge opening.

13. The inflator device according to claim 9 wherein the filter is not disposed over any of the plurality of reaction housing discharge openings.

14. The inflator device according to claim 9 wherein the filter housing base portion comprises a shoulder extending into the filter chamber, the shoulder including a first shoulder face and a second shoulder face extending at an angle from the first shoulder face, and the filter abuts the first shoulder face and the at least one of the plurality of reaction housing discharge openings is in discharge orientation toward the second shoulder face.

15. The inflator device according to claim 9 wherein the filter housing top portion is welded to the reaction housing side wall end.

16. The inflator device according to claim 9 additionally comprising an initiator diffuser disposed between the initiator device and the supply of gas generant material, the initiator diffuser including a plurality of radially oriented diffuser discharge openings disposed in discharge orientation toward the reaction housing side wall.

17. The inflator device according to claim 9 wherein the inflator device has a toroidal shape for driver side placement within a vehicle steering wheel.

* * * * *